(12) United States Patent
Miyahara et al.

(10) Patent No.: US 8,375,815 B2
(45) Date of Patent: Feb. 19, 2013

(54) ROLLING ELEMENT SCREW DEVICE

(75) Inventors: Soshi Miyahara, Tokyo (JP); Hideo Saito, Tokyo (JP); Toshiaki Kadono, Tokyo (JP); Masahiko Yoshino, Tokyo (JP); Takashi Sakuyama, Tokyo (JP); Tsutomu Togashi, Tokyo (JP); Kazuhiro Tani, Tokyo (JP); Eri Kameda, Tokyo (JP); Futoshi Nakamura, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 13/260,832

(22) PCT Filed: Apr. 9, 2010

(86) PCT No.: PCT/JP2010/056461
§ 371 (c)(1),
(2), (4) Date: Sep. 28, 2011

(87) PCT Pub. No.: WO2010/125900
PCT Pub. Date: Nov. 4, 2010

(65) Prior Publication Data
US 2012/0017713 A1 Jan. 26, 2012

(30) Foreign Application Priority Data
Apr. 30, 2009 (JP) .................................. 2009-110814

(51) Int. Cl.
*F16H 25/24* (2006.01)
(52) U.S. Cl. .......................... 74/89.44; 74/424.82; 184/5
(58) Field of Classification Search .................. 74/89.23, 74/89.44, 424.82; 184/5
See application file for complete search history.

(56) References Cited

U.S. PATENT DOCUMENTS

| 6,125,968 | A | 10/2000 | Shirai | |
|---|---|---|---|---|
| 6,568,508 | B2 * | 5/2003 | Kinney et al. | 184/5 |
| 6,595,327 | B2 * | 7/2003 | Keller | 184/5 |
| 7,000,493 | B2 * | 2/2006 | Fujita et al. | 74/89.44 |
| 2005/0201644 | A1 | 9/2005 | Lee et al. | |

FOREIGN PATENT DOCUMENTS

| JP | 6-249319 A | 9/1994 |
|---|---|---|
| JP | 4-078358 A | 3/1998 |

(Continued)

OTHER PUBLICATIONS

International Search Report of PCT/JP2010/056461, mailing date May 18, 2010.

*Primary Examiner* — William C Joyce
(74) *Attorney, Agent, or Firm* — Westerman, Hattori, Daniels & Adrian, LLP

(57) ABSTRACT

A rolling-element screw device includes: a large number of rolling elements; a screw shaft having an outer periphery on which a rolling groove for the large number of rolling elements is helically formed; a nut member which has a through-hole through which the screw shaft is passed and which is threadedly engaged with the screw shaft through intermediation of the large number of rolling elements; a lubricant supply hole formed through the nut member from an outer peripheral surface of the nut member to an inner peripheral surface of the nut member; a lubricant tank mounted to the outer peripheral surface of the nut member and comprising an accommodating chamber for lubricant; and a lubricant applying body standing from the lubricant tank, and inserted into the lubricant supply hole along with amounting operation of the lubricant tank with respect to the nut member.

3 Claims, 4 Drawing Sheets

FOREIGN PATENT DOCUMENTS

| | | |
|---|---|---|
| JP | 10-184683 A | 7/1998 |
| JP | 10-227311 A | 8/1998 |
| JP | 11-201258 A | 7/1999 |
| JP | 2003-232427 A | 8/2003 |
| JP | 2005-256901 A | 9/2005 |
| JP | 2006-292122 A | 10/2006 |
| JP | 2007-225033 A | 9/2007 |
| JP | 2008-215444 A | 9/2008 |
| JP | 2009-014120 A | 1/2009 |

* cited by examiner

ROLLING ELEMENT SCREW DEVICE

TECHNICAL FIELD

The present invention relates to a rolling-element screw device such as a ball screw and a roller screw, and more particularly, to a rolling-element screw device having a function of applying lubricant to a rolling-element rolling groove of a screw shaft.

BACKGROUND ART

The rolling-element screw device such as a ball screw and a roller screw includes a screw shaft having an outer peripheral surface provided with a helical rolling groove for rolling elements such as balls and rollers, and a nut member formed into a substantially cylindrical shape and threadedly engaged with the screw shaft through intermediation of the large number of rolling elements. Further, a load-rolling groove facing the rolling groove of the screw shaft is formed in an inner peripheral surface of the nut member. The rolling groove of the screw shaft and the load-rolling groove of the nut member face each other, with the result that a load-rolling path for the rolling elements is helically formed on a periphery of the screw shaft. Then, when the screw shaft is rotated relatively to the nut member, the rolling elements revolve around the screw shaft while rolling in the load-rolling path, with the result that the nut member performs a translational movement into an axial direction of the screw shaft.

Further, a rolling-element returning member called a return pipe or a deflector is mounted to the nut member. The rolling-element returning member has a circulation path coupling one end and another end of the load-rolling path to each other so that the rolling elements are returned from the one end to the another end of the load-rolling path through the circulation path. In other words, when the load-rolling path and the circulation path are coupled to each other, an infinite circulation path for the rolling elements is formed along the nut member.

In such a rolling-element screw device, for the purpose of preventing a life of the device from being shortened, it is necessary to supply an appropriate amount of lubricant between the rolling elements and the rolling groove of the screw shaft and between the rolling elements and the load-rolling groove of the nut member.

Conventionally, as a supply structure for a lubricant with respect to the rolling-element screw device, for example, as disclosed in JP 10-184683A, there has been known a supply structure in which lubricant applying devices are mounted at both axial ends of the nut member. Each of the applying devices includes a lubricant tank formed into a ring shape through which the screw shaft passes and mounted to the axial end portion of the nut member, and an applying body slightly projecting from an inner peripheral surface of the lubricant tank so as to come into contact with a rolling groove of the screw shaft. When the screw shaft and the nut member are rotated relatively to each other, the applying body applies a lubricant stored in the lubricant tank to the screw shaft little by little.

Meanwhile, as another supply structure for a lubricant with respect to the rolling-element screw device, there has been known a supply structure as disclosed in JP 2003-232427 A. In this supply structure, an applying body to come into contact with a rolling groove of a screw shaft is built in a rolling-element returning member. When the rolling-element returning member is mounted to the nut member, the applying body comes into contact with the rolling groove of the screw shaft. Further, a lubricant tank storing lubricant is formed into a substantially C-shape and fitted to an outside of the nut member in a manner of embracing the nut member. Coupling pipes serving as supply paths for the lubricant are arranged from the lubricant tank to the applying body built in the rolling-element returning member so that the lubricant in the lubricant tank is absorbed by the applying body through the coupling pipes.

Citation List

Patent Literature

Patent Literature 1: JP 10-184683 A
Patent Literature 2: JP 2003-232427 A

DISCLOSURE OF THE INVENTION

Problems to be Solved by the Invention

However, as disclosed in JP 10-184683 A, when the ring-shaped lubricant tanks are mounted to both the axial ends of the nut member, the screw shaft is passed through the lubricant tanks each formed into a ring shape. Thus, even when the lubricants in the lubricant tanks are depleted, it is impossible to dismount the lubricant tanks from the nut member so as to replace the same. Meanwhile, an entire length of the nut member including the lubricant tanks is long, and hence a stroke distance of the nut member with respect to the entire length of the screw shaft is shortened by that much. In other words, as a capacity of each of the lubricant tanks becomes higher so as to increase capacities of initially loaded lubricants, the stroke distance of the nut member with respect to the screw shaft is reduced.

Meanwhile, in the lubricating structure disclosed in JP 2003-232427 A, although the lubricant tank can be mounted and dismounted with respect to the nut member, in order to replace the lubricant tank, it is necessary to detach the coupling pipes once from the lubricant tank or the applying body and to remount the coupling pipes after replacement of the lubricant tank is completed. As a result, time and effort are required for the replacement. Further, the lubricant tank formed into a substantially C-shape covers almost all an outer peripheral surface of the nut member, which may lead to a risk that heat radiation of the nut member is hindered.

Means for Solving the Problems

The present invention has been made in view of such problems, and it is therefore an object of the present invention to provide a rolling-element screw device which does not sacrifice a stroke distance of a nut member although carrying a sufficient amount of lubricant, or hinder heat radiation of the nut member, and contributes to facilitation of a replacement operation of a lubricant tank.

In order to achieve the above-mentioned object, a rolling-element screw device according to the present invention includes: a large number of rolling elements; a screw shaft having an outer periphery on which a rolling groove for the large number of rolling elements is helically formed; a nut member which has a through-hole through which the screw shaft is passed and which is threadedly engaged with the screw shaft through intermediation of the large number of rolling elements; a lubricant supply hole formed through the nut member between an outer peripheral surface of the nut member and an inner peripheral surface of the nut member; a lubricant tank mounted to the outer peripheral surface of the nut member and including an accommodating chamber for lubricant; and a lubricant applying body standing from the lubricant tank, and inserted into the lubricant supply hole along with a mounting operation of the lubricant tank with respect to the nut member, the lubricant applying body having a leading end portion coming into contact with the rolling groove of the screw shaft so as to apply the lubricant.

Effects Of The Invention

In such a rolling-element screw device according to the present invention, the lubricant tank is mounted to the outer peripheral surface of the nut member. Thus, even when the lubricant tank itself is upsized by setting a capacity of the accommodating chamber for the lubricant to be large, the stroke distance of the nut member with respect to the screw shaft is not reduced, which is advantageous in suppressing the entire length of the rolling-element screw device including the screw shaft. Further, the lubricant tank is mounted to the outer peripheral surface of the nut member, and hence can be easily replaced.

Further, the lubricant applying body for applying the lubricant to the rolling groove of the screw shaft stands from the lubricant tank, and is inserted into the lubricant supply hole along with the mounting operation of the lubricant tank with respect to the nut member, the lubricant supply hole being formed in the nut member. Thus, the lubricant applying body is also inserted and removed with respect to the nut member along with replacement of the lubricant tank, and hence it is unnecessary to reconnect the lubricant tank and the lubricant applying body to each other at each replacement of the lubricant tank. Also in this regard, the lubricant tank can be easily replaced. Further, even when the leading end of the lubricant applying body is liable to cause clogging due to dirt adhering to the rolling groove of the screw shaft, the lubricant applying body is replaced simultaneously with replacement of the lubricant tank. Still further, as described above, the replacement operation of the lubricant tank can be easily performed, and hence the lubricant applying body can also be easily replaced, which leads to an advantage of easily maintaining a satisfactory lubricating state of the screw shaft along which the rolling elements roll.

MODE FOR CARRYING OUT THE INVENTION

In the following, detailed description is made of a rolling-element screw device of the present invention with reference to the accompanying drawings.

Figure 1:
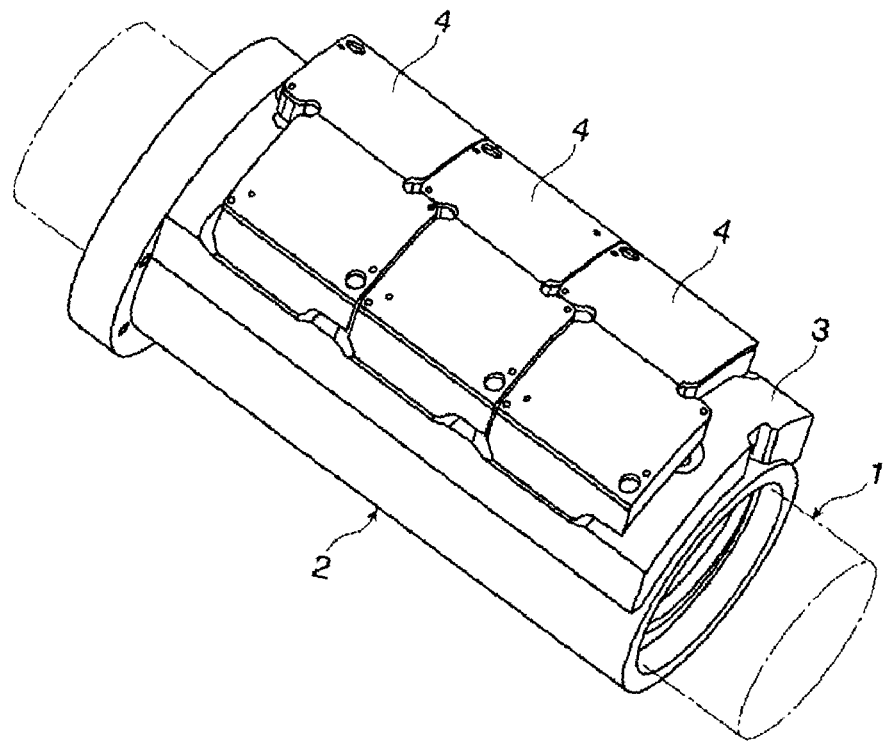
[FIG. 1] perspective view illustrating an example of a ball-screw device to which the present invention is applied.

FIG. 1 illustrates an example in which the present invention is applied to a ball-screw device. The ball-screw device includes a screw shaft 1 having an outer peripheral surface provided with a helical rolling groove in which balls as rolling elements roll, a nut member 2 threadedly engaged with the screw shaft 1 through intermediation of the large number of balls, and lubricant tanks 4 mounted to an outer peripheral surface of the nut member 2 through intermediation of a cover plate 3. Note that, in FIG. 1, the screw shaft 1 is illustrated by dashed lines.

Figure 2:
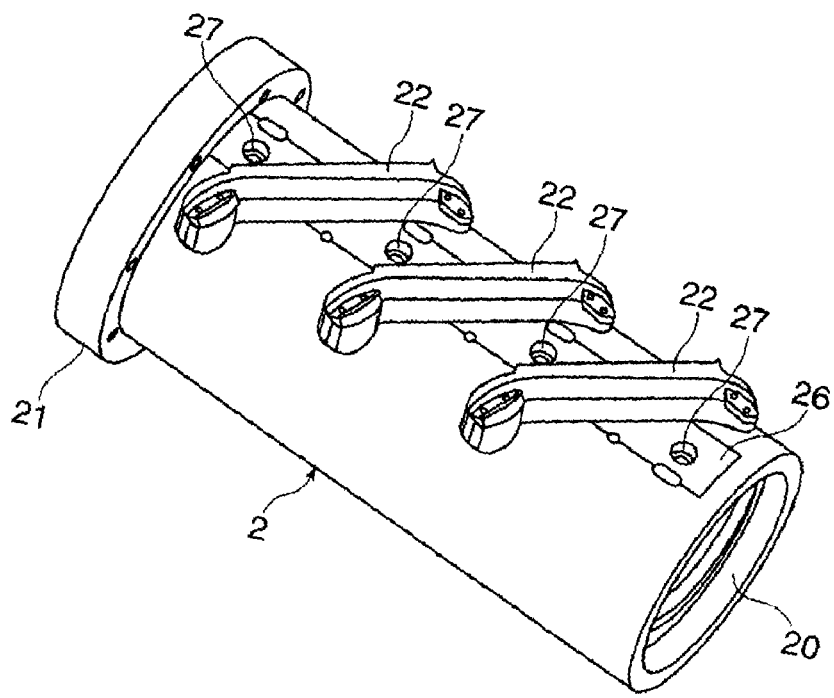
[FIG. 2] A perspective view of a nut member of the ball-screw device illustrated in FIG. 1.

FIG. 2 is a perspective view illustrating a state in which the lubricant tanks 4 and the cover plate 3 are dismounted from the nut member 2. The nut member 2 has a through-hole 20 through which the screw shaft 1 is passed so that the nut member 2 is formed into a substantially cylindrical shape. A flange portion 21 for fixing the nut member 2 to another mechanical device is provided at one end in an axial direction. A fixing hole for a fixing bolt is formed through the flange portion 21. Further, the nut member 2 is provided with three infinite circulation paths for the balls, and a rolling-element returning member 22 is fixed to each of the infinite circulation paths on the outer peripheral surface of the nut member 2.

Figure 3:
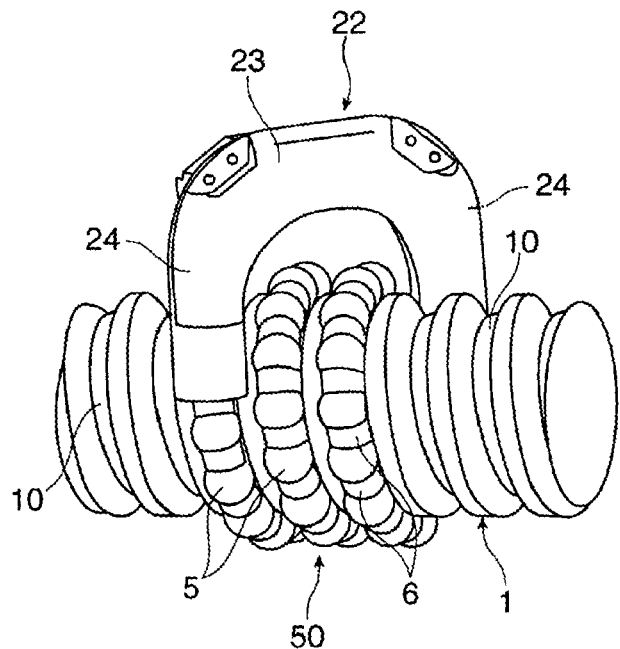
[FIG. 3] A perspective view illustrating a positional relation between a screw shaft and a rolling-element returning member of the ball-screw device illustrated in FIG. 1.

FIG. 3 is a perspective view illustrating a relation between the screw shaft 1 and the rolling-element returning member 22, in which the nut member 2 is not illustrated. In the outer peripheral surface of the screw shaft 1, a rolling groove 10 in which balls 5 roll is helically formed with a predetermined lead. Here, the lead represents a distance by which the rolling groove 10 shifts in an axial direction of the screw shaft 1 in accordance with one rotation of the screw shaft 1. The screw shaft 1 is illustrated by dashed lines in FIG. 1, and inserted in the through-hole 20 of the nut member 2. On a periphery of the screw shaft 1, a load-rolling path 50 for the balls 5 is helically provided along the rolling groove 10, and the large number of balls 5 are arranged in the load-rolling path 50. The balls 5 arranged in the load-rolling path 50 roll between the screw shaft 1 and the nut member 2 while bearing load.

Meanwhile, the rolling-element returning member 22 includes a path portion 23 fixed to the outer peripheral surface of the nut member 2, and a pair of leg portions 24 provided at both ends of the path portion 23, and has substantially a U-shape as a whole. A circulation path for the balls 5 is formed in the path portion 23 and the leg portions 24, and the balls 5 roll in a non-load state in the circulation path from one of the leg portions 24 to another of the leg portions 24. That is, the rolling-element returning member 22 has a circulation path having an inner diameter larger than diameters of the balls 5 so that the rolling-element returning member 22 is formed into a pipe shape.

The rolling-element returning member 22 is arranged in a manner of striding over the screw shaft 1, and at the same time, jumping over several loops of the helical rolling groove 10 of the screw shaft 1 so that the balls 5 having rolled in the load-rolling path 50 to reach one end thereof are introduced from the one of the leg portions 24 into the circulation path and sent out from the another of the leg portions 24 to another end of the load-rolling path 50. In other words, the balls 5 are arranged also in the rolling-element returning member 22 illustrated in FIG. 3, and an infinite circulation path for the balls 5 is formed of the helical load-rolling path 50 and the circulation path in the rolling-element returning member 22 continuous with each other. As described above, the three rolling-element returning members 22 are mounted to the nut member 2. Thus, on the nut member 2, the three infinite circulation paths for the balls 5, each of which is the same as that illustrated in FIG. 3, are formed in series along the axial direction of the screw shaft 1.

Note that, in the example illustrated in FIG. 3, in order to prevent the balls 5 from coming into contact with each other, a spacer 6 is arranged between the ball 5 and the ball 5 adjacent to each other. However, the spacer 6 may be omitted when necessary.

Figure 4:
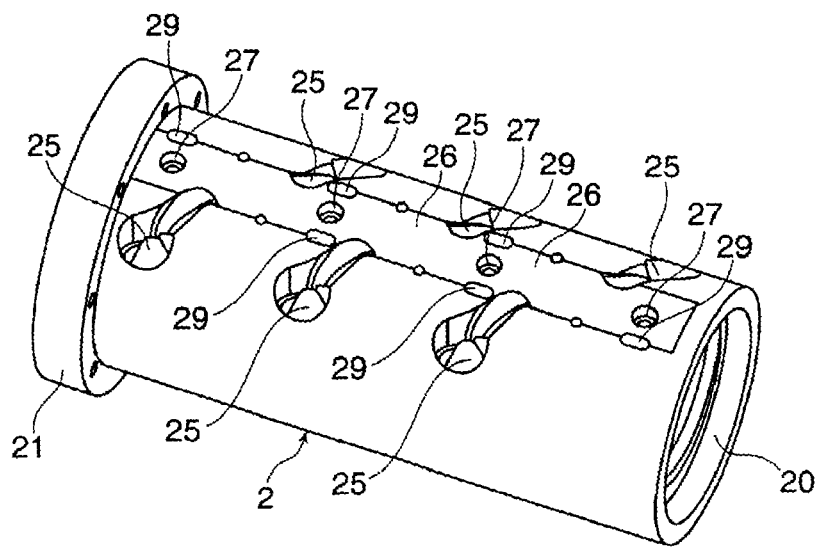
[FIG. 4] A perspective view illustrating a state in which the rolling-element returning member is detached from the nut member illustrated in FIG. 2.

FIG. 4 is a perspective view of an external appearance of the nut member 2 from which the rolling-element returning members 22 are removed. The nut member 2 is provided with rolling-element passing holes 25 into which the leg portions 24 of each of the rolling-element returning members 22 are inserted. The rolling-element passing holes 25 are provided in pairs, and in the illustrated example, six rolling-element passing holes 25 are provided in three pairs correspondingly to the number of the rolling-element returning members 22. Further, a mounting surface for fixing the cover plate 3 is formed between the two rolling-element passing holes 25 in pairs, and a plurality of tap holes 27 are arranged at a center of the mounting surface 26.

Figure 5:
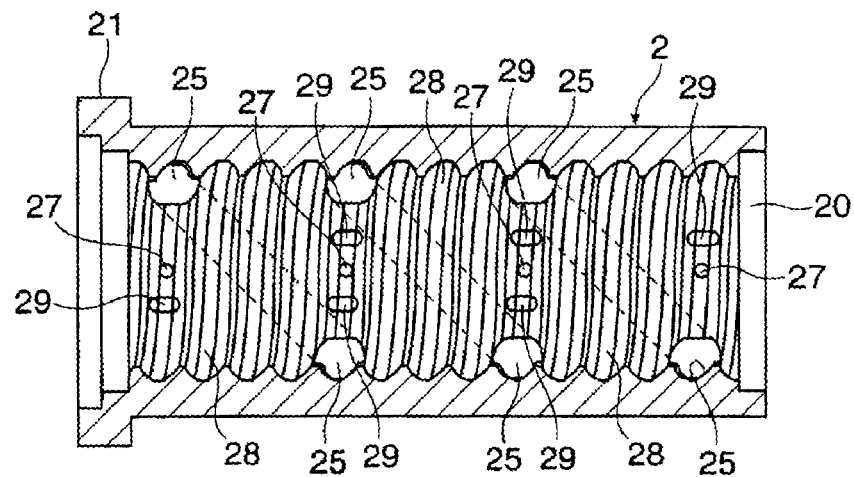
[FIG. 5] A sectional view taken along an axial direction of the nut member.

FIG. 5 is a sectional view obtained by bisecting the nut member 2 along the axial direction, illustrating an inner peripheral surface of the through-hole 20 of the nut member 2, viewing the above-mentioned rolling-element passing holes 25 from an inside of the nut member 2. In the inner peripheral surface of the through-hole 20 of the nut member 2, there is formed a helical load-rolling groove 28 facing the rolling groove 10 of the screw shaft 1, the rolling groove 10 of the screw shaft 1 and the load-rolling groove 28 of the nut member 2 facing each other so as to form the load-rolling path 50 for the balls 5. Each of the rolling-element passing holes 25 is provided in a tangential direction with respect to the inner peripheral surface of the through-hole 20 of the nut member 2. When the leg portions 24 of each of the rolling-element returning members 22 are inserted respectively into the rolling-element passing holes 25, the load-rolling groove 28 and the circulation path of each of the rolling-element returning members 22 are continuous with each other. Note that, in FIG. 5, the pairs of rolling-element passing holes 25 each coupled by broken lines are coupled with each other by the respective rolling-element returning members 22.

Meanwhile, as illustrated in FIGS. 4 and 5, the nut member 2 is provided with a plurality of lubricant supply holes 29 passing between the outer peripheral surface and an inner peripheral surface thereof. Those lubricant supply holes 29 are arranged along edge portions of the mounting surface 26 and correspond to the rolling-element passing holes 25 positioned on both sides of the mounting surface. In other words, the lubricant supply holes 29 are arranged as many as the rolling-element passing holes 25 with respect to the nut member 2.

As illustrated in FIG. 5, the lubricant supply holes 29 are opened to an inside of the load-rolling groove 28. However, the balls 5 helically roll in the load-rolling groove 28 between the pair of rolling-element passing holes 25 coupled with each other by the broken lines in FIG. 5, and roll in the circulation path in the rolling-element returning member 22 provided between the rolling-element passing holes 25. Therefore, the balls 5 do not roll on positions at which the lubricant supply holes 29 are opened. Further, the lubricant supply holes 29 are provided at positions at which the lubricant supply holes 29 overlap the load-rolling groove 28. Thus, when the screw shaft 1 is assembled to the nut member 2, the rolling groove 10 of the screw shaft 1 is positioned immediately below the lubricant supply holes 29.

Figure 6:
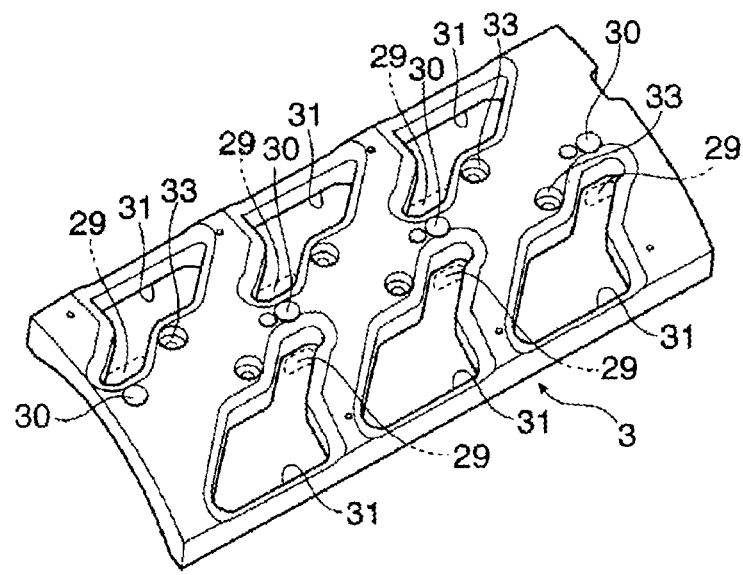
[FIG. 6] A perspective view illustrating a front surface side of a cover plate.
Figure 7:
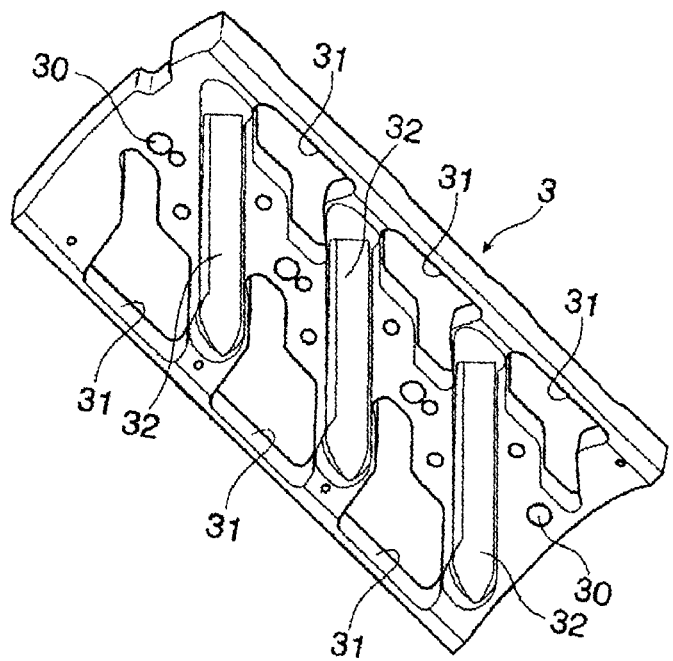
[FIG. 7] A perspective view illustrating a rear surface side of the cover plate.

FIGS. 6 and 7 are perspective views of the cover plate 3. FIG. 6 illustrates a front surface side on which the lubricant tanks 4 are mounted, and FIG. 7 illustrates a rear surface side on which the cover plate 3 is to abut against the nut member 2. The cover plate 3 is fixed with fixing bolts to the mounting surface 26 of the nut member 2, and bolt fixing holes 30 for insertion of the fixing bolts are provided at positions corresponding to the tap holes 27 of the nut member 2. Further, the cover plate 3 is provided with tank mounting holes 31 for positioning the lubricant tanks 4 with respect to the nut member 2. The tank mounting holes 31 partially overlap the lubricant supply holes 29 opened in the nut member 2. In FIG. 6, positions of the lubricant supply holes with respect to the tank mounting holes are illustrated by broken lines.

Further, the cover plate doubles as a fixer for the rolling-element returning members with respect to the nut member. As illustrated in FIG. 7, on the rear surface side of the cover plate 3, there are formed accommodating grooves 32 to each of which the path portion 23 of the rolling-element returning member 22 is fitted. Thus, after the leg portions 24 of each of the rolling-element returning members 22 are inserted into the rolling-element passing holes 25 of the nut member 2, when the cover plate 3 is fixed to the nut member 2 from above the rolling-element returning members 22, the rolling-element returning members 22 are firmly fixed to the nut member 2.

The cover plate 3 is formed to have a width substantially equal to or smaller than an outer diameter of the nut member 2 in a radial direction of the nut member 2. Thus, at least half an area of the outer peripheral surface of the nut member 2 is exposed without being covered with the cover plate 3.

Note that, in FIG. 6, tap holes used for fixation of the lubricant tanks 4 with respect to the cover plate 3 are denoted by reference symbol 33.

Figure 8:
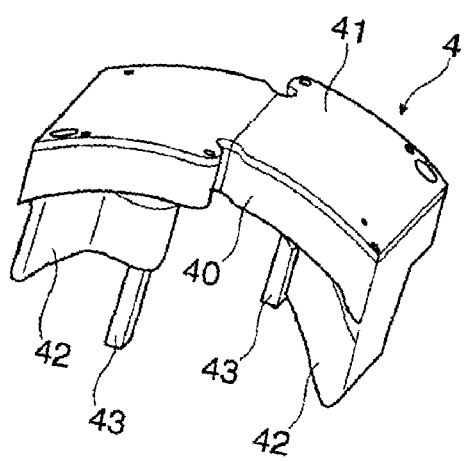
[FIG. 8] A perspective view of a lubricant tank.

FIG. 8 illustrates the lubricant tank 4. The lubricant tank 4 includes a tank body 40 having an accommodating chamber for lubricant, and a lid member 41 for sealing the accommodating chamber of the tank body 40. The accommodating chamber accommodates an occlusion body formed of non-woven fabric such as felt, and the lubricant is stored in the accommodating chamber in a state of being impregnated in the occlusion body. Further, a pair of positioning leg portions 42 to be fitted to the tank mounting holes 31 of the cover plate 3 project from the tank body 40. When those positioning leg portions 42 are respectively fitted to the corresponding tank mounting holes 31, the lubricant tank 4 is fixed to an appropriate position with respect to the nut member 2.

Further, lubricant applying bodies 43 project respectively from the positioning leg portions 42. Those lubricant applying bodies 43 are each formed of bar-shaped non-woven fabric such as felt. One end of each of the lubricant applying bodies 43 is connected to the occlusion body in the accommodating chamber, and the lubricant impregnated in the occlusion body is gradually absorbed into the lubricant applying bodies 43 by a capillary phenomenon. The lubricant applying bodies 43 stand from the tank body 40 along a fitting direction of the lubricant tank 4 with respect to the cover plate 3, that is, insertion directions of the positioning leg portions 42 with respect to the tank mounting holes 31, and are provided at positions corresponding to the lubricant supply holes 29 of the nut member 2. Thus, when the lubricant tanks 4 are mounted to the cover plate 3, the lubricant applying bodies 43 are inserted straight into the lubricant supply holes 29 of the nut member 2, and leading ends of the lubricant applying bodies 43 come into contact with the rolling groove 10 of the screw shaft 1, which is positioned immediately below the lubricant supply holes 29. With this, the lubricants in the lubricant tanks 4 are continuously applied to the rolling groove 10 of the screw shaft 1.

As illustrated in FIG. 5, the lubricant supply holes 29 into which the lubricant applying bodies 43 are inserted are provided to the nut member 2 correspondingly to the individual rolling-element passing holes 25, and positions at which the lubricant applying bodies 43 come into contact with the rolling groove 10 of the screw shaft 1 are near positions at which the balls 5 enter the load-rolling path 50 from the rolling-element returning member 22. Therefore, the lubricant applying bodies 43 have already applied the lubricant to positions in the rolling groove 10, at which the balls 5 are in a state immediately before starting to roll toward the rolling groove 10 of the screw shaft 1. As a result, the balls 5 can be always maintained in a satisfactory lubricating state.

Note that, in the ball-screw device according to this embodiment illustrated in FIG. 1, the three lubricant tanks are mounted to the cover plate, and the two lubricant applying bodies are provided to each of the lubricant tanks as illustrated in FIG. 8. However, sizes, shapes, and the number of the lubricant tanks may be appropriately selected, and the number of the lubricant applying bodies standing from the lubricant tanks may also be appropriately selected. Further, the lubricant tanks may be fixed directly to the outer peripheral surface of the nut member without use of the cover plate.

In the ball-screw device structured as described above, for example, when the screw shaft 1 is rotated with respect to the nut member 2, the large number of balls 5 arranged between those screw shaft 1 and nut member 2 helically roll in the load-rolling path 50 illustrated in FIG. 3, and infinitely circulate through the rolling-element returning member 22. As a result, the nut member 2 performs a translational movement along the screw shaft 1. Further, the lubricant applying bodies 43 inserted through the lubricant supply holes 29 into the nut member 2 are held in contact with the rolling groove 10 of the screw shaft 1. Thus, when a relative rotational movement occurs between the screw shaft 1 and the nut member 2, the lubricants in the lubricant tanks 4 are continuously applied to the rolling groove 10 of the screw shaft 1. In this way, the balls 5 to roll in the rolling groove 10 are reliably lubricated with the lubricants. Further, when the lubricants in the lubricant tanks 4 are depleted, the lubricant tanks 4 are replaced with new ones.

At this time, the lubricant applying bodies 43 standing from the lubricant tanks 4 are inserted into the lubricant supply holes 29 along with a mounting operation of the lubricant tanks 4 with respect to the nut member 2, and in the nut member 2, the leading ends of the lubricant applying bodies 43 come into contact with the rolling groove 10 of the screw shaft 1. Thus, the lubricant tanks 4 can be readily replaced.

Further, the lubricant applying bodies 43 wipe off dirt in the rolling groove 10 of the screw shaft 1, and hence the lubricant applying bodies 43 may temporally cause clogging. However, in the ball-screw device, the lubricant applying bodies 43 can also be readily replaced along with replacement of the lubricant tanks 4.

Further, the lubricant tanks 4 are mounted and dismounted in the radial direction of the nut member 2 with respect to the outer peripheral surface of the nut member 2, and hence can be easily replaced even under a state in which the nut member 2 is assembled to the screw shaft 1. In addition, even when the lubricant tanks 4 are upsized so as to increase storing amounts of the lubricants, the entire length in the axial direction of the nut member 2 does not vary at all, and hence a stroke distance of the nut member 2 with respect to the screw shaft 1 is not influenced. As a result, capacities of the lubricant tanks 4 can be arbitrarily selected in accordance with operating frequency of the ball-screw device.

Still further, directions in which the lubricant applying bodies 43 stand from the lubricant tank 4 correspond to the directions in which the positioning leg portions 42 of the lubricant tank 4 are inserted into the tank mounting holes 31 of the cover plate 3. Thus, when the positioning leg portions 42 of the lubricant tank 4 are inserted into the tank mounting holes 31 of the cover plate 3, the lubricant applying bodies 43 standing from the positioning leg portions 42 are inserted into the lubricant supply holes 29 of the nut member 2 in accordance therewith. Reversely, when the positioning leg portions 42 of the lubricant tank 4 are pulled out from the tank mounting holes 31 of the cover plate 3 for the purpose of dismounting the lubricant tank 4 from the cover plate 3, the lubricant applying bodies 43 are pulled out from the lubricant supply holes 29 of the nut member 2. That is, the cover plate 3 functions as a guide member for insertion of the lubricant applying bodies 43 into the lubricant supply holes 29 of the nut member 2. Along with the mounting operation of the lubricant tank 4 with respect to the nut member 2, the lubricant applying bodies 43 can be reliably inserted into the lubricant supply holes 29 so that the leading ends thereof are brought into contact with the screw shaft 1.

Yet further, at least half the area of the outer peripheral surface of the nut member 2 is exposed without being covered with the cover plate 3. Thus, the lubricant tanks 4 mounted to the cover plate 3 do not hinder heat radiation of the nut member 2, and hence a temperature increase of the nut member 2 during use of the ball-screw device can be suppressed. As a result, movement accuracy of the ball-screw device is prevented from being impaired.

Yet further, in the ball-screw device, the cover plate 3 doubles as the fixer for the rolling-element returning members 22 with respect to the nut member 2. Thus, a structure for mounting the lubricant tanks 4 to the nut member 2 can be simplified, and the heat radiation of the nut member can be promoted in comparison with that in a case where the lubricant tanks and the rolling-element returning members are fixed with use of separate fixers to the nut member.

Note that, although the present invention is applied to the ball-screw device in the example described above in this embodiment, the present invention is applicable also to a roller-screw device using rollers as rolling elements.

The invention claimed is:

1. A rolling-element screw device, comprising:
   a large number of rolling elements;
   a screw shaft having an outer periphery on which a rolling groove for the large number of rolling elements is helically formed;
   a nut member which has a through-hole through which the screw shaft is passed and which is threadedly engaged with the screw shaft through intermediation of the large number of rolling elements;
   a lubricant supply hole formed through the nut member between an outer peripheral surface of the nut member and an inner peripheral surface of the nut member;
   a lubricant tank mounted to the outer peripheral surface of the nut member and comprising an accommodating chamber for lubricant;
   a lubricant applying body standing from the lubricant tank, and inserted into the lubricant supply hole along with a mounting operation of the lubricant tank with respect to the nut member, the lubricant applying body having a leading end portion coming into contact with the rolling groove the screw shaft so as to apply the lubricant; and
   a cover plate fixed to the outer peripheral surface of the nut member and comprising a tank mounting hole for positioning the lubricant tank,
   wherein the lubricant tank comprises a positioning leg portion to be fitted into the tank mounting hole, and
   wherein the lubricant applying body stands from the lubricant tank along an insertion direction of the positioning leg portion with respect to the tank mounting hole.

2. The rolling-element screw device according to claim 1, wherein the cover plate is formed to have a width equal to or smaller than an outer diameter of the nut member in a radial direction of the nut member.

3. The rolling-element screw device according to claim 1, further comprising a rolling-element returning member forming an infinite circulation path for the large number of rolling elements, the rolling-element returning member being mounted to the outer peripheral surface of the nut member, wherein the cover plate comprises an accommodating groove for the rolling-element returning member, which is formed in a contact surface of the cover plate with respect to the nut member, and wherein the cover plate is fixed to the nut member in a manner of covering the rolling-element returning member.

\* \* \* \* \*